United States Patent

[11] 3,588,429

| [72] | Inventors | Gunther Kampf;<br>Bernhard Vinzelberg, Krefeld-Bockum;<br>Helmut Walz, Leverkusen, Germany |
|---|---|---|
| [21] | Appl. No. | 745,636 |
| [22] | Filed | July 17, 1968 |
| [45] | Patented | June 28, 1971 |
| [73] | Assignee | Farbenfabriken Bayer Aktiengesellschaft<br>Leverkusen, Germany |

[54] PROCESS AND APPARATUS FOR ELECTRICALLY HEATING AND CONTROLLING THE TEMPERATURE OF THIN LAYERS
5 Claims, 5 Drawing Figs.

| [52] | U.S. Cl. | 219/50 |
| [51] | Int. Cl. | H05b 3/00 |
| [50] | Field of Search | 219/50; 73/363, 362 (C.P.); 340/228, 228 (F); 338/22, 23; 219/504, 505, 109, 110 |

[56] References Cited
UNITED STATES PATENTS

| 3,469,224 | 9/1969 | Riddel et al. | 338/22 |

FOREIGN PATENTS

| 710,363 | 6/1954 | Great Britain | 38/4 |

*Primary Examiner*—J. V. Truhe
*Assistant Examiner*—Hugh D. Jaeger
*Attorney*—Burgess, Dinklage and Sprung

ABSTRACT: Novel heating, controlling and temperature measuring process and apparatus including means for impressing two different currents onto an electrically conductive layer on the substance in question and controlling one current as a function of the other. The two circuits may use common terminals and in any case are electrically separated from each other by conventional means.

PATENTED JUN 28 1971 3,588,429
FIG. 1
FIG. 2
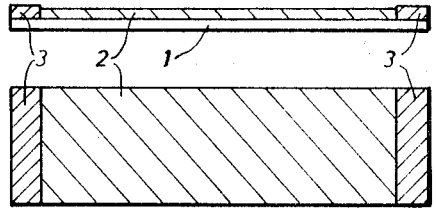
FIG. 3
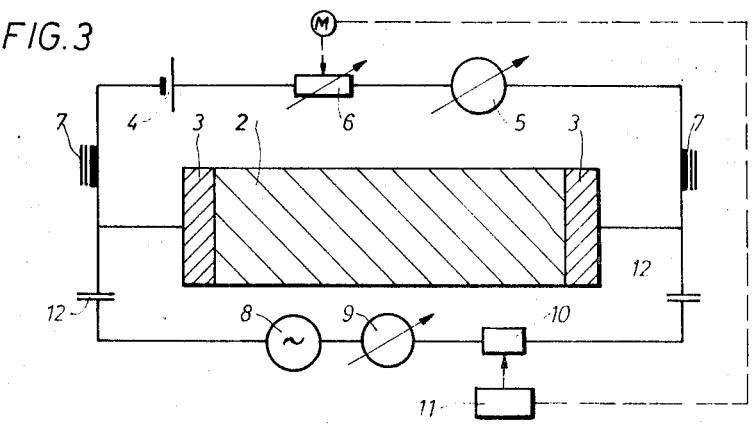
FIG. 4
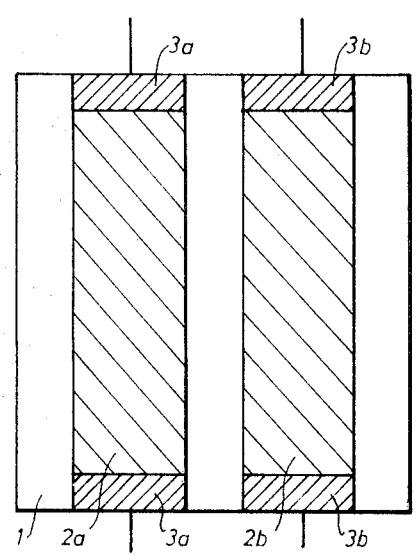
FIG. 5
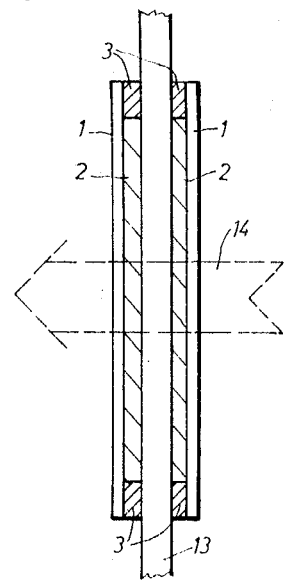
INVENTORS:
GÜNTHER KÄMPF, BERNHARD VINZELBERG, HELMUT WALZ
BY:
Burgess, Dinklage & Sprung

PROCESS AND APPARATUS FOR ELECTRICALLY HEATING AND CONTROLLING THE TEMPERATURE OF THIN LAYERS

A process and an apparatus for electrically heating and controlling the temperature of articles of glass, quartz, porcelain, ceramics, synthetic resin, enameled or oxidized metal or either like bodies which have been plated or vapor coated with thin, electrically conducting layers having a resistance which depends upon the temperature variation.

Processes in which heat is supplied to an object either by direct supply of energy to the object to be heated or by contact of the object to be heated with heating elements are known. The supply of heat to the object, or the heating of the heating element, may be carried out in these processes by electric resistance heating, heating with high energy radiation, or contact with hot gases or hot liquids.

Furthermore, heating processes are known in which thin electrically conductive layers are applied directly to the objects to be heated or to electrically insulating support materials for the heating element, and these layers are then heated by the passage of an electric current therethrough. In objects which have a low thermal capacity, heating by means of thin layers has the advantage that it can be effected very quickly due to this low thermal capacity. Certain types of these layers may also be optically transparent. Such layers are useful for numerous purposes, e.g. for display windows, windscreens and microscope heating tables.

Measurement of the temperature of heated objects is in most cases carried out separately from the heat production in such objects. Such measurement may be by known methods, for example using thermometers, resistance thermometers, thermoelectric elements of pyrometers. Temperature measurement and heat production are therefore carried out with different elements which are in different positions with relation to the object. This in turn has the result that the temperatures measured in this way may vary considerably from the true temperature of the object, due to the inevitable local temperature gradients and the lack of responsiveness of the usual temperature measuring instruments.

Furthermore, a process is known in which an electric current which is used for the production of heat is at the same time used to measure the temperature. This process has the disadvantage, which makes it unreliable due to inaccuracies i.e., that the measuring current is identical to the heating current and its magnitude, which depends on the required temperature, may assume very different values from the instantaneous temperature. In particular, the accuracy of measurement according to this procedure does not satisfy the requirements of modern physical methods of measurement if at high temperatures a heating current is also used as measuring current for determining the temperature induced by that heating current.

According to the invention, these disadvantages are avoided by having a measuring current which is separate from the heating circuit and which serves as a regulating means for the control of temperature control in the layer through which the heating current flows.

The measuring current is in this way completely independent of the size of the heating current, and temperature measurements can be carried out with extreme accuracy and the temperature can also be adjusted exactly. In particular, the intensity of the measuring current may be adjusted to be very low so that it makes no detectable contribution to the heating of the layer.

For this purpose, a layer of electrically conducting material that has a resistance which is dependent upon the temperature, is applied either directly to the object which is to be heated, or to an electrically and thermally insulating support, e.g. by vapor deposition, and the heating element formed in this way is brought into contact with the object which is to be heated. In addition to the heating current, an electrically separate measuring current which is very small compared with the heating current is passed through this layer at the same time.

According to a particular embodiment of the process according to the invention, direct and/or alternating currents of different frequencies can be used as heating current and measuring current, respectively, the measuring current being very much smaller than the heating current and the heating and measuring currents being separated from each other by known means, for example by means of condensers, choke coils, electrical filters or the like.

Furthermore, the measuring current may be used as a regulating means for controlling the heating current. It is thereby possible to construct automatically functioning and self-controlling combined heating and measuring elements such as are used, for example, for microscope heating tables etc.

The apparatus according to the invention for carrying out this process is distinguished in that the combined heating and measuring layer is coated with at least one protective layer. This is advantageous especially at high temperatures when measuring objects which conduct electric current or which give off or take up oxygen. This protective layer insulates the combined heating and measuring layer electrically and/or prevents chemical or physical damage to the layer, for example by oxidation, mechanical damage, corrosion etc. For this purpose for example, layers of $SiO_2$, which are preferably applied by vapor deposition with electron guns, and layers of $CaF_2$ inter alia, are suitable. In order to avoid undesired optical reflections, the refractive index of the covering layer chosen should be similar to the refractive index of the combined heating and measuring layer.

Electrically conductive materials of any desired type may be used for the combined heating and measuring layer, depending on the purpose for which they are required. Semiconductor materials are especially suitable owing to their high temperature coefficients which make the measurement of the temperature thereof very sensitive. The basic resistance and temperature coefficient of the combined heating and measuring layer can be varied widely and adapted to the required conditions by the choice of covering material, the stoichiometrical relationships in the covering material (e.g. oxygen in excess or subequivalent amounts), the doping with foreign atoms, the conditions of application or vapor deposition etc.

According to an especially advantageous embodiment of the apparatus, the combined heating and measuring layer and also the protective layer and the support material are made of substances which have a high permeability or high absorption to electromagnetic radiation of certain frequencies or frequency ranges, especially in the visible and/or infrared region of the spectrum.

The oxide of tetravalent tin (deficient in oxygen), which can be applied by known processes, is given as one example of such optically transparent materials for use in these layers. The specific resistance and the temperature coefficient of the resistance of the layer can be varied within wide limits by adjusting the ratio of oxygen to tin and by suitable doping, for example with antimony. Other examples are, inter alia, $In_2O_3$, $CdO$, $TiO_2$, $GeO_2$ and thin metal layers.

It is especially advantageous to use a combined heating and measuring layer in known manner as the resistance in one branch of a bridge circuit which is supplied with alternating current. In this embodiment, it is advantageous to supply the diagonal voltage of a bridge to a differential amplifier, the difference signal of which acts on the regulating amplifier for the heating current after it has been rectified and which is also further worked up for temperature indication.

It is especially advantageous if two combined heating and measuring layers are arranged respectively on both faces of flat objects, a measuring beam, for example, a beam of light, infrared radiation or radiation from other frequency ranges of the electromagnetic spectrum being directed perpendicularly to the combined heating and measuring layers and to the object.

In the special case of materials which are permeable to infrared radiation, $SnO_2$ (preferably with an oxygen deficit) may be used for the layers and $SiO_2$, $CaF_2$, $MgF_2$, $LiF$, $ZnS$ etc. may be used for the support materials and covering layers.

According to a particular embodiment of the apparatus, a combined heating and measuring layer which is permeable to visible light is provided for use in the determination of melting points.

For this purpose, the substance which is to have its melting point measured is applied to the combined heating and measuring layer. Determination of the melting point may be carried out optically by observation with direct light or with transmitted light if the support materials, the combined heating and measuring layer and the protective layers are transparent in the visible range of the spectrum. Melting point determination may also be carried out by measuring the temperature retaining point.

According to a further embodiment, at least two combined heating and measuring layers are arranged for determining melting points, one layer carrying the substance which is to have its melting point measured and the other layer or layers carrying the comparison substance or substances of known melting temperatures. The electric circuit of the individual layers enables the temperatures and retaining points of the individual substances to be determined.

Numerous embodiments of the invention given by way of example are shown diagrammatically in the drawings in which:

FIG. 1 is a side view;

FIG. 2 is top plan view of a combined heating and measuring element;

FIG. 3 shows one possible electric circuit arrangement;

FIG. 4 shows a top view of another embodiment; and

FIG. 5 shows the side view of the other embodiment of the combined heating and measuring element.

In FIGS. 1 and 2, the support 1 is coated with a combined heating and measuring layer 2 and has two electrodes 3 which carry current.

In FIG. 3, the heating current from the source 4 of direct current is supplied via the terminals 3 to the combined heating and measuring layer 2 which is applied to the support 1 or directly to the object which is to be heated.

The magnitude of the heating current is indicated on the instrument or recording device 5 and is varied by the current regulating resistor 6. At the same time, an alternating current, which is produced by the alternating voltage generator 8 and which is the measuring current and which must be negligibly small compared with the heating current, also flows via the same terminals 3 through the combined heating and measuring layer 2. If the temperature coefficient of resistance of the layer 2 is known, the magnitude of the measuring current is a measure of the temperature of the layer; it is indicated by the instrument or recording device 9 which is desirably calibrated in temperature values. Part of the measuring voltage is tapped at the resistor 10 through which the measuring current flows, and is compared with a reference voltage 11 which may be fixed at any desired value or varied according to a preselected temperature-time programme; the difference between the measuring voltage and the reference voltage is supplied to the regulating resistor of the heating circuit, for example through a servomotor M. The regulating regulator 6 is so controlled that the measuring voltage and reference voltage are identical, i.e. the temperature of the combined heating and measuring layer has reached the desired temperature. When the regulating part of circuit has been switched off, the regulating resistor 6 may also be operated by hand. The chokes 7 and condensers 12 serve to separate the heating circuit and measuring circuit electrically from each other.

In FIG. 4, the reference numeral 1 again indicates the support, 2a and 2b the electrically identical combined heating and measuring layers for the substance A which is to be investigated and the comparison substance B, and 3a and 3b indicate the electrical contacts. The separate measuring circuits and heating circuits are not shown for this drawing. The melting points of substances A and B are read off the associated temperature recording device (not illustrated) at their critical retaining points. The measuring layers 2a and 2b could also be connected into opposite branches of a bridge circuit in the electric circuit; the critical points of substances A and B in that case give a sharp signal to a recording device connected into the zero branch of the bridge, by means of which signal the melting point can be determined accurately in conjunction with the actual temperature measurement.

In FIG. 5, the object 13 which is to be measured is provided on both faces with combined heating and measuring layers 2 which are either applied directly to the object or applied to supports 1 with which they are pressed to the two faces of the object in the form of a sandwich. The course of the radiation 14 selected for investigation, e.g. visible light or infrared light, as indicated in broken lines, is directed perpendicularly to the apparatus. In double radiation instruments, combined heating and measuring layers are advantageously introduced into the path of the comparison beam without an object to be measured, in order to eliminate completely even the smallest infrared bands of the combined heating and measuring layers as well as those of the support materials or covering layers.

In general, the combined heating and measuring layers are suitable for use in all cases in which temperatures must be capable of rapid adjustment and direct transmission to the object and in which the temperature of the object is to be measured accurately and preferably directly on the heated object itself and in which the temperature adjustment should be controllable if required. A large number of possible applications are possible, for example in nuclear and electron spin resonance spectroscopy, ultraviolet and Raman Spectroscopy, melt viscosimetric measurements, etc.

We claim:

1. Process for electrically heating, controlling the temperature and measuring the temperature of a solid body which body has plated or vapor coated thereon an electrically conductive layer having a resistance which is dependent on temperature; which process comprises impressing a heating electrical current on said conductive layer through an electrical circuit including a source of said heating current and said layer; impressing a separate measuring current of smaller magnitude than said heating current, on said conductive layer through an electrical circuit including a source of said measuring current and said layer, electrically separating said heating and measuring circuits from each other; and controlling said heating current as a function of said measuring current.

2. A process as claimed in claim 1 wherein said measuring and heating currents are direct and alternating.

3. A process as claimed in claim 1 wherein said circuits have a common pair of terminals on said conductive layer.

4. A process as claimed in claim 1 wherein said measuring and heating currents are both alternating of different frequencies.

5. An apparatus for heating and simultaneously measuring the temperature of a body comprising: said body; an electrically conductive layer plated or vapor coated on such body which layer has an electrical resistance which is a function of and is dependent upon the temperature of such layer; a heating circuit including means for impressing a heating current upon said conductive layer and including said conductive layer; a measuring circuit including means for impressing a measuring current upon said conductive layer and including said conductive layer; means for electrically separating said circuits; and means for controlling said heating current as a function of said measuring current.

UNITED STATES PATENT OFFICE
CERTIFICATE OF CORRECTION

Patent No. 3,588,429      Dated June 28, 1971

Inventor(s) GÜNTHER KÄMPF, BERNHARD VINZELBERG and HELMUT WALZ

It is certified that error appears in the above-identified patent and that said Letters Patent are hereby corrected as shown below:

Title page, the address of the inventor Gunther Kampf should be Krefeld-Bockum; the address of the inventor Bernhard Vinzelberg should be Leverkusen, Germany; column 1, line 33, "of" should be --or--; column 3, line 56, after "resistor" insert --6--

Signed and sealed this 14th day of December 1971.

(SEAL)
Attest:

EDWARD M. FLETCHER, JR.
Attesting Officer

ROBERT GOTTSCHALK
Acting Commissioner of Patents